No. 684,588. Patented Oct. 15, 1901.
F. F. RAYMOND, 2d.
HEEL ATTACHING MACHINE.
(Application filed Jan. 19, 1898. Renewed Aug. 7, 1901.)

(No Model.) 5 Sheets—Sheet 1.

Fig. 1.

WITNESSES
INVENTOR

No. 684,588. Patented Oct. 15, 1901.
F. F. RAYMOND, 2d.
HEEL ATTACHING MACHINE.
(Application filed Jan. 19, 1898. Renewed Aug. 7, 1901.)

(No Model.) 5 Sheets—Sheet 2.

WITNESSES. INVENTOR.

No. 684,588. Patented Oct. 15, 1901.
F. F. RAYMOND, 2d.
HEEL ATTACHING MACHINE.
(Application filed Jan. 19, 1898. Renewed Aug. 7, 1901.)

(No Model.) 5 Sheets—Sheet 3.

Fig. 4.

WITNESSES. INVENTOR.

No. 684,588. Patented Oct. 15, 1901.
F. F. RAYMOND, 2d.
HEEL ATTACHING MACHINE.
(Application filed Jan. 19, 1898. Renewed Aug. 7, 1901.)

(No Model.) 5 Sheets—Sheet 4.

WITNESSES.
J. W. Dolan,
Leo A. Walsh

INVENTOR.
F. F. Raymond 2d.

No. 684,588. Patented Oct. 15, 1901.
F. F. RAYMOND, 2d.
HEEL ATTACHING MACHINE.
(Application filed Jan. 19, 1898. Renewed Aug. 7, 1901.)

(No Model.) 5 Sheets—Sheet 5.

WITNESSES.
J. N. Dolan.
Leo A. Walsh.

INVENTOR
F. F. Raymond

UNITED STATES PATENT OFFICE.

FREEBORN F. RAYMOND, 2D, OF NEWTON, MASSACHUSETTS, ASSIGNOR, BY MESNE ASSIGNMENTS, TO THE UNITED SHOE MACHINERY COMPANY, OF NEW JERSEY, A CORPORATION OF NEW JERSEY.

HEEL-ATTACHING MACHINE.

SPECIFICATION forming part of Letters Patent No. 684,588, dated October 15, 1901.

Application filed January 19, 1898. Renewed August 7, 1901. Serial No. 71,221. (No model.)

*To all whom it may concern:*

Be it known that I, FREEBORN F. RAYMOND, 2d, a citizen of the United States, and a resident of Newton, in the county of Middlesex and State of Massachusetts, have invented a new and useful Improvement in Heel-Attaching Machines, of which the following is a full, clear, and exact description, reference being had to the accompanying drawings, forming a part of this specification, in explaining its nature.

The invention comprises a heel-attaching machine having a carrier for the heel-blank and attaching-nails, and a top lift which is adapted to be turned from an upper right-side-up receiving position to a lower inverted attaching position, which carrier may have combined with it a templet and a top-lift spanker, and which carrier is also held by stationary supports, whereby it is stationary during the attaching operations, and which carrier also preferably is turned upon a horizontal center, which center extends across the machine from side to side, whereby the carrier is provided with a movement upon an arc or circle which is in line with the longitudinal length of the last or work-support from heel to toe.

The invention further comprises the employment in connection with a device of this character of means for moving the last or work-support forcibly toward the templet and against the heel thereon to compress the heel immediately in advance of the driving of the attaching-nails and to hold it compressed during the driving of the attaching-nails and for also moving the last or work-support, the shoe, and the attached heel toward and from the top-lift spanker.

It further comprises a reciprocating head within the pressure-head for reciprocating the drivers in driving the attaching-nails.

It further comprises various other features, which will be hereinafter fully described.

Figure 1:
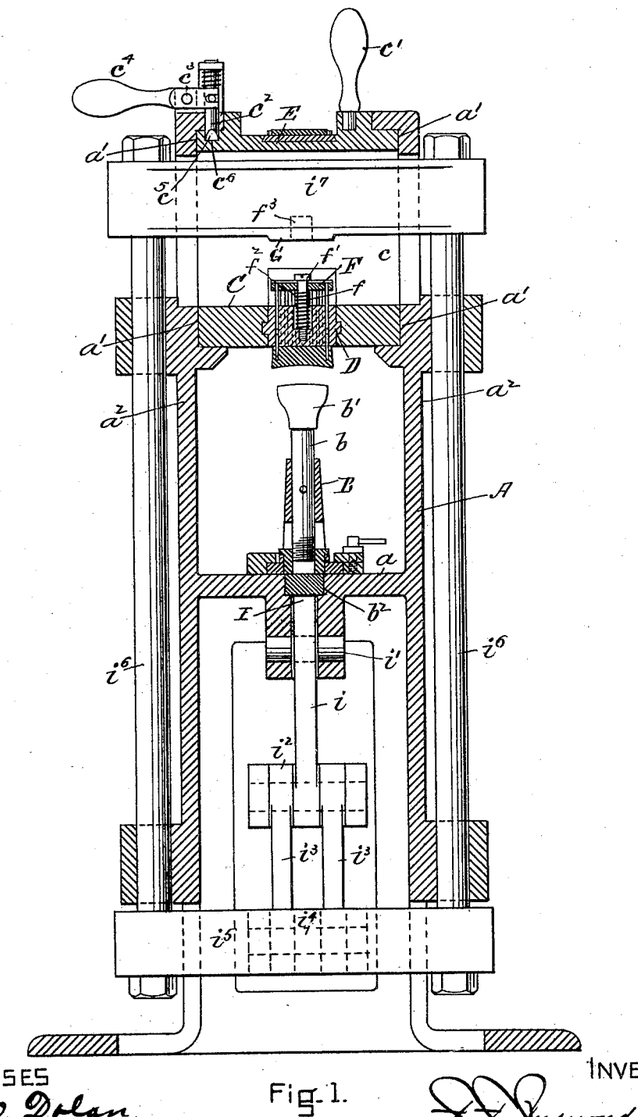
Figure 1 is a view in vertical section of the machine, taken from side to side.
Figures 5, 6, 7, 8:
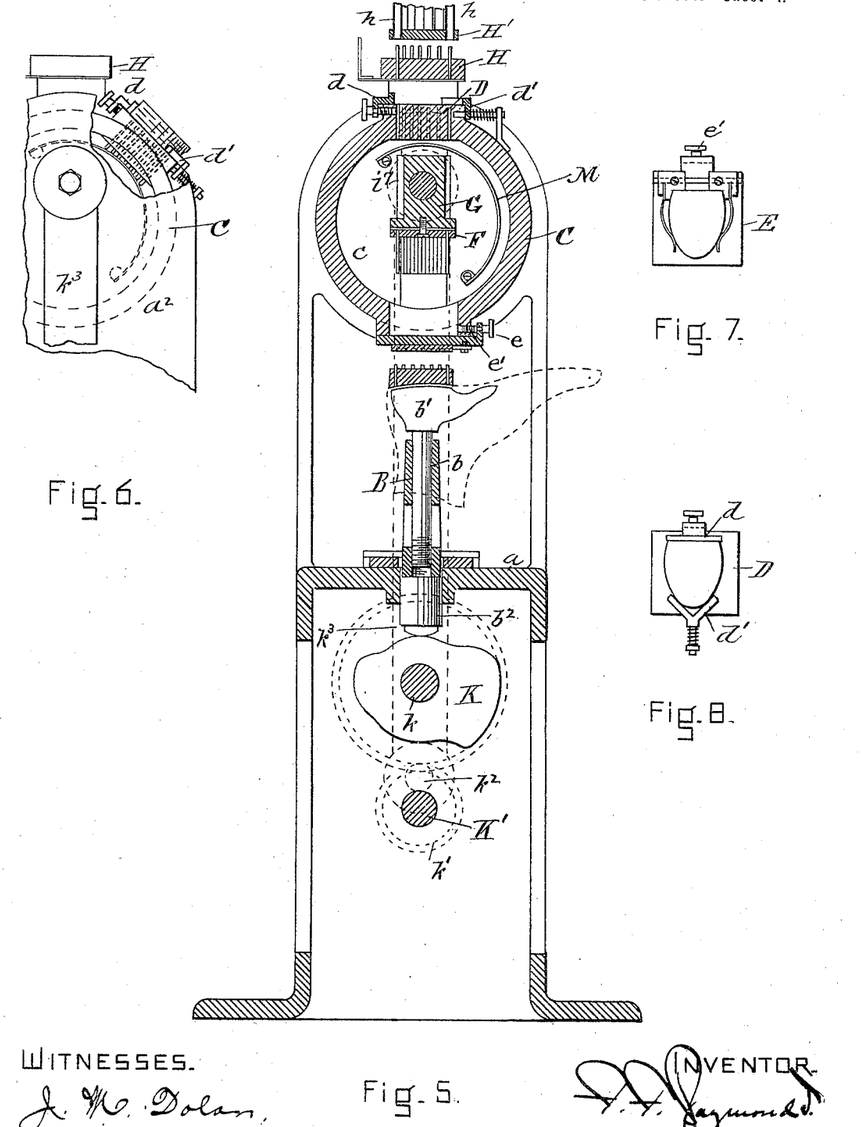
Fig. 5 is a view of the parts represented in Fig. 4, the heel-blank and top-lift carrier being in a reversed position and the machine also being represented as provided with a section of a nail-loading apparatus.
Fig. 6 is a detail view showing the heel-carrier as turned slightly from the nail-loader and as having a heel-blank thereon.
Fig. 7 is a view in plan of one form of heel-holder for holding and centering the heel-blank upon the carrier.
Fig. 8 is a view in plan to represent the templet-block and a heel holding and centering device for centering the heel thereon and holding it thereto.

The main frame A of the machine is narrow. It has a bed $a$ for the jack B and stationary bearings $a'$ at the upper ends of its uprights or sides $a^2$ for supporting the carrier C and in which said carrier may be moved. The bearings are hollow throughout their length, and the carrier C is preferably cylindrical in shape and is held by the bearings $a'$ in a manner to permit it to be oscillated any portion of a revolution or turned a full revolution. The uprights $a^2$, bearings, and carrier are made heavy and strong, as they withstand the pressure to which the heel-blank is subjected during the attaching operation. The carrier C has mounted upon it a templet D and a spanker-block E. The templet D preferably is removable from the carrier, and it preferably has what is known as a "multiple die"—that is, it is provided with a large number of perforations arranged to receive attaching-nails of any desired order and number for varying sizes of heels. The perforations extend through the templet. Within the cavity $c$ of the rotary carrier is a driver-block F, having a driver for each hole of the templet, and when the templet has a multiple die the driver-block has multiple drivers to correspond. The driver-block and drivers may be carried by the carrier and turned therewith, as represented in Fig. 1, or they may be attached to the driver-head G, as shown in Fig. 5. They are attached to the carrier to be turned therewith when the means for vertically moving the jack are of the nature represented in Fig. 2—that is, when the same cam or device is used for moving the jack to the top lift as is used in moving the jack for the compression of the heel in the attaching operation—and when there is no variation in the level to which the bottom of the last is raised in these two operations. The driver-block and drivers when so used are mounted upon the carrier to be turned therewith in any desirable way. I have represented in Figs. 1 and 2 the templet D as made quite thick—thick enough to provide holes of a length to receive the attaching-nails and also act as supports for the drivers. The free ends of the drivers are always contained in these holes to any desired extent, and where a multiple die and multiple drivers are used the drivers act as guides for the driver-block, which hardly needs any auxiliary or additional guide.

Figures 2, 3:
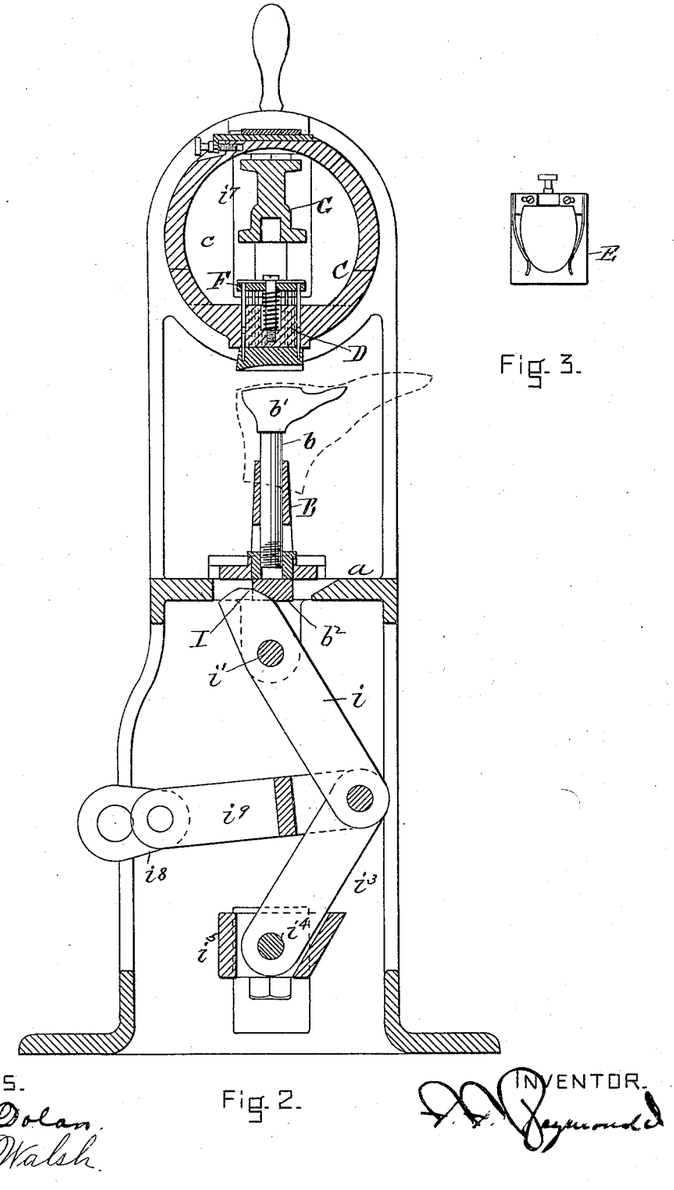
Fig. 2 is a view in vertical section, taken from front to back.
Fig. 3 is a view in plan of the top-lift spanker and top-lift holder, the spanker being represented as removed from its carrier.

In Figs. 1 and 2 I have represented the employment of a guide $f$ for the driver-block and drivers, which is fastened to the templet in any desirable way and which extends inward or upward therefrom through a hole in the driver-block. It has a head $f'$, which limits the extent of the movement of the driver-block away from the templet, and there is an interposed coiled spring $f^2$, which is partially contained in a pocket in the templet-block which surrounds the guide and which is adapted to be compressed upon the downward movement of the drivers and driver-block and which also upon the release of the drivers and driver-block lifts the drivers and driver-block to the position represented in Fig. 1. The driver-head is provided with a hole $f^3$ in line with the guide and into which the upper end of the guide enters upon the downward movement of the driving-head and the driver-block. It will be seen that with this construction the nail-driving devices are turned with the nail-carrier and heel-carrier and are in operative relation with the driver-head G only when directly beneath the same and when at either side of the driver-head or above it they are not actuated by it even if the driver-head then makes a reciprocation; also, that after the driving action of the driver-head the spring lifts the driver-block and drivers upward in respect to the templet and holds them partially removed from the templet during the turning of the carrier.

Figure 4:
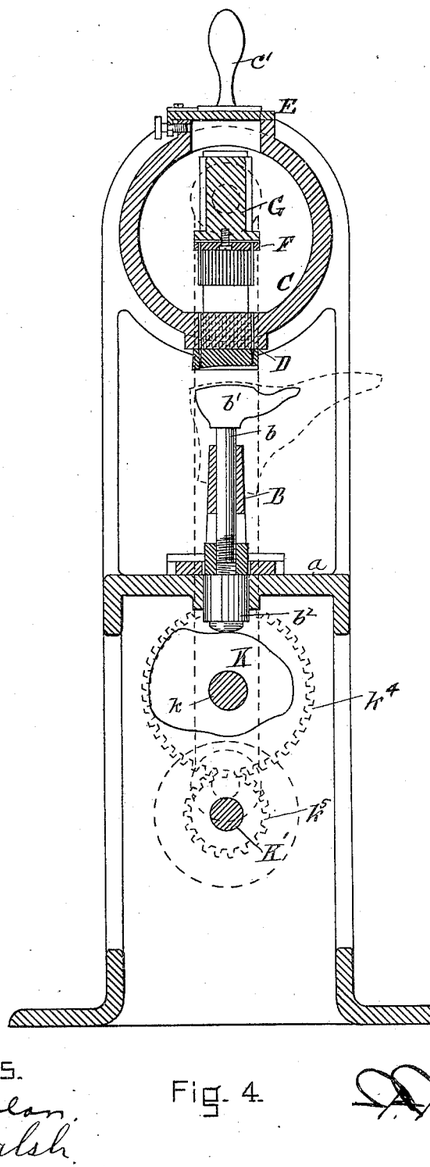
Fig. 4 is a view in vertical section of the machine from front to back, illustrating a modification.

In Figs. 4 and 5 the drivers are represented as mounted in a driver-plate, which is attached to the driver-head G instead of to the carrier. Whichever construction is employed it is desirable that there be enough throw to the driver-head or the time of its action shall be so regulated as not to begin the driving of the attaching-nails until the heel-blank has been compressed against the templet by the upward movement of the jack in relation thereto when actuated by its cam or other actuating device.

It will be understood that the templet is adapted to receive, when turned to its highest position or any other position removed from an attaching position, a loaded heel-blank, which is centered thereon and held thereto by the portions of the attaching-nails which project into the appropriate receiving-holes of the templet. The templet may also serve to receive loose attaching-nails, and when so employed it is desirable that nails shall be supplied it when in its highest position or as represented in Fig. 5, and these may be fed to the holes of the templet either by a hand moved or operated loading-skimmer or by a plate-loader or by means of an automatic loader arranged to deliver nails to the templet when in its highest position, and the lower part of such an automatic loader is represented in Fig. 5.

Figure 9:
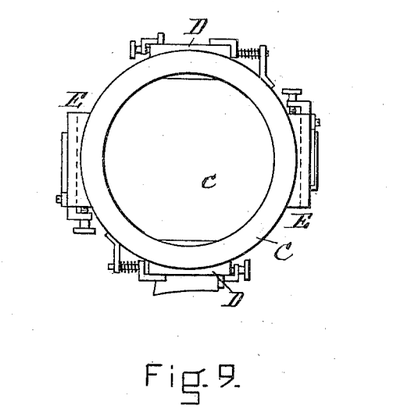
Fig. 9 is a view in side elevation of a carrier having two templets and heel-holders and two top-lift spankers and centering devices, which are represented as oppositely arranged thereon, but which may not be so, but which may be arranged with a top-lift spanker and holder opposite a templet.
Figure 10:
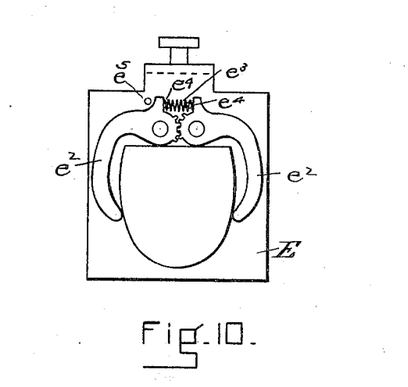
Fig. 10 is a view representing a modified form of a top-lift holder to which reference is hereinafter made.

H is a stationary multiple-die nail-receiving block having the same arrangement of holes as those of the multiple die of the templet D, the upper ends of which holes may receive detachably-connected nail-distributing tubes $h$, through which the nails are fed from the automatic nail-supplying devices to the holding-block, or the tubes may be held by an independent support H'. When loose attaching-nails are thus used in the machine, the templet preferably has on its base for holding a heel-blank thereto while it is being transferred to attaching position for centering and for holding it suspended in attaching position a heel-holding device similar to that shown in Figs. 5, 6, and 8, comprising an adjustable breast-gage $d$ and a yielding V-shaped back-presser $d'$, which gage and presser serve to hold the heel by its breast and back portion against the templet, and the heel is applied to the holder and templet at any desired time and place after the nails have been fed to the templet. The top-lift spanker E is attached to the carrier C to be adjustable horizontally thereon in a manner to permit it to be moved lengthwise the heel, and I have represented it as connected with the carrier by a dovetailed tongue and groove and as adjusted by a screw $e$ on the spanker-block and a threaded opening or nut $e'$ on the carrier. The adjusting-screw serves to move the spanker-block back and forth and to hold it in any desired position. The spanker-block also has a top-lift holder of any desired structure, and in Fig. 10 I have represented one having the arms $e^2$ connected together, so that a closing or opening movement of one causes a similar movement of the other. These arms are closed by a spring $e^3$, which tends to separate their rear portions $e^4$, between which said spring lies, thus forcing the tips of the arms together and tending to force the breast of the top lift toward the rear of the said arms. $e^5$ is a stop to limit the throw of the arms $e^2$. The carrier may have the templet and top-lift spanker diametrically opposite each other, as represented in Fig. 1, whereby they are interchangeable in position upon a half revolution or turn of the carrier, or the carrier may bear duplicate templets and duplicate top-lift-spanking devices, as shown in Fig. 9, where the templets are represented as arranged diametrically opposite each other and the top-lift spankers diametrically opposite each other. The jack B is longitudinally movable upon the bed, has a vertically-movable jack-post $b$ carrying the last or work-support $b'$ at its upper end, and at its lower end bears upon a pressure head or block $b^2$, preferably carried in the bed $a$ and vertically movable therein and to which vertical upward movement is imparted by a lifting-cam I, shaped and operated to lift the pressure-head and jack-post to their highest or substantially their highest position before the attaching-nails are driven, in order that the heel may be compressed between the last-bottom and the templet before the attaching-nails are entirely driven and preferably before they are driven at all, as it is found in practice that the attaching-nails drive straighter and there is much less liability of the nails being deflected from a straight line as they are being driven and of the heel being moved laterally out of position in respect to the templet and soles of the shoe during the attaching operation if it is compressed and held clamped with the heel end of the soles between the last and templet in advance of the driving of the attaching-nails and is so held during the driving of the attaching-nails.

In Figs. 1 and 2 the cam is represented as applied to the upper end of a link $i$, pivoted at $i'$ and forming a part of a toggle $i^2$, the lower part $i^3$ of which is pivoted at $i^4$ to a vertically-movable lower cross-head $i^5$, which is connected with the driver-head G by connecting-rods $i^6$ and an upper cross-head $i^7$, which extends through the hollow bearings $a'$ and the cavity $c$ of the carrier and upon which the driver-head G is mounted or formed. The toggles are operated by a crank $i^8$ and connecting pitman or link $i^9$. This construction necessitates the use of the form of carrier C, driving devices, and driver-head represented in Figs. 1 and 2, as two reciprocations of the cross-head are necessary for attaching the heel-blank and the top lift and as the cam I is twice operated, first, to compress and hold the heel, and, second, to spank the top lift and lifts the last or work-support to the same level each operation. It will also be understood that with this organization the level of the spanker-plate E is very nearly the thickness of a top lift higher than the level of the face of the templet D when in their operative positions; otherwise there would be no allowance for the extra thickness of the top lift in the top-lift-spanking operation. For simplicity of construction and rapidity of action this form of carrier and head is a desirable one; but I do not wish to be understood as limiting the invention to an organization in which the driver-head has two reciprocations or an idle one while a top lift is being spanked to the heel, as the driver-head may be provided with a single driving movement for driving the drivers at the proper interval and then remain stationary during the attachment of the top life.

In Figs. 4 and 5 I have represented a rotating cam K for lifting the pressure-head $b^3$ and the jack-post. It is upon a shaft $k$, which is driven by shaft K′, having at its outer end crank-disks $k'$, having crank-pins $k^2$, which connect with the cross-head $i^7$ by pitmen $k^3$. The driver-block and drivers are in this form of my invention dissociated from the carrier and attached to the cross-head G, and the surface of the spanker-plate when in spanking position is at a lower level than the level of the under surface of the templet when in operative position in order that the drivers upon their second but inoperative reciprocation may not extend to the lower surface of the spanker-plate. This form of spanker-plate is made hollow upon its inner side to provide room for the lower ends of the drivers at the lower end of their second reciprocation. The cam K is constructed to lift the last or work-support, first, to a level which shall compress the heel-blank against the templet in the attaching operation, and, second, to a lower level for spanking the top lift against the spanker-block having the lower spanking-surface. The gears $k^4$ on the cam-shaft K are engaged by pinions $k^5$ upon the main shaft K′, which has a fly-wheel and a starting and stopping clutch. (Not shown.) In some instances the cam-shaft may not be geared up, in which case the crank-pins for operating the driver-head will be carried directly by it and it will also carry the starting and stopping clutch or mechanism. When it is geared up, the crank-disks and the gearing may be combined upon the outer sides of the frame, so as to render the gearing accessible, and the crank-pins will then be carried by either the upper or lower pair of gears. The carrier C is preferably turned by hand while the machine is at rest. The machine in blindnailing makes two distinct reciprocations in attaching a heel and top lift and requires two starting operations upon the part of the operator. The carrier may, however, be turned automatically, in which event but one starting operation would be necessary, and the machine would then make two reciprocations after one starting operation before coming to rest. The attaching of the heel will then immediately be followed by the automatic feeding and spanking of the top lift. When the carrier C is turned by hand, it may be provided with turning-handles $c'$ and the overhead latch $c^2$, pivoted at $c^3$, having a handle $c^4$ and a latching end $c^5$ to engage one of the latching-recesses $c^6$ in the carrier, there being as many latching-recesses as there are templets and top-lift spankers. When the construction represented in Fig. 5 is used and loose nails are fed to the holes of the inverted templet, a stationary curved nail-retaining plate M is employed to hold the nails from dropping through the templet while it is being turned from its highest to its lowest position. This curved plate is supported by a bar extending through the cavity of the bearing to one of the uprights $a^2$. An attaching-machine having this form of construction is simple in construction, quick in operation, and not liable to get out of order and an improvement upon the type to which it belongs (represented in Letters Patent of the United States granted to me February 14, 1899, No. 619,707, in that the heel and nail and top-lift carriers, while having the advantages which arise from turning them to an exposed or inverted position for the reception of the heel-blank, nails, and top lift, are not attached to a reciprocating pressure-head, but are attached to a stationary support, whereby, while provided with a turning movement, they do not have a reciprocating movement, but may be used as a stationary part of the means for providing the preliminary compression of the heel-blank or a compression in advance of the driving action of the drivers. It is also an improvement over previous constructions of the said type in that the carrier surrounds the nail-driving head and is independent of it and is not rotated in a cavity or aperture within it, and whereby the templet and top-lift holder are constantly accessibly exposed, and the heel and top lift may be applied to the templet and top-lift holder in any desired position of the carrier or at any point in its rotation. It is also an improvement in that as the carrier does not reciprocate with the cross-head the templet and the top-lift holder are accessible for loading the nails and top lift while the cross-head is being reciprocated. It is also an improvement because the receiving positions of the templet and top-lift holder are always the same and are always stationary. It is also an improvement because the carrier is moved and presents the heel and top lift in alinement with the length of the shoe, and its wear does not tend to throw it out of said alinement with the heel end of the shoe. A construction which involves a movement of the heel-blank and top lift crosswise in respect to the last and shoe requires, in the first place, very accurate work to provide for the proper registration of the carrier in operative position, and, second, very nice construction in order that such registration may continue accurate and not be influenced by wear, a very little wear tending to move the carrier and the heel-blank and top lift to one side or the other sufficiently to interfere with the best and closest work.

Having thus fully described my invention, I claim and desire to secure by Letters Patent of the United States—

1. In a heel-attaching machine, in combination with means for attaching a heel, a non-reciprocating, rotatable heel-carrier provided with means for securing and carrying a heel, means whereby said heel-carrier may be locked in an attaching position, and a last or work-support vertically movable relatively to said carrier, whereby said heel may be placed upon said carrier, the carrier rotated to an attaching position, and the last or work-support reciprocated to attach the heel, as set forth.

2. In a heel-attaching machine, in combination, a non-reciprocating rotatable heel-carrier provided with means for receiving and carrying a heel, means whereby said heel-carrier may be locked in a driving position, a last or work-support vertically movable relative to said carrier, and a reciprocating nail-driving mechanism mounted upon said carrier, as and for the purposes set forth.

3. In a heel-attaching machine the combination with means for attaching a heel a non-reciprocating, rotatable carrier, a perforated templet mounted thereon to turn therewith from an inverted or partially-inverted to a driving position, means for locking said carrier and a last or work-support vertically movable in relation to said templet, as and for the purposes set forth.

4. In a heel-attaching machine, in combination, a non-reciprocating rotatable carrier, a perforated templet mounted thereon and adapted to receive a heel and its attaching-nails and transfer it from an inverted or partially-inverted to a driving position, means for locking said carrier in said driving position, a driving mechanism, a last or work-support vertically movable with respect to said templet and means for moving said last vertically toward said templet to compress the heel-blank against the same, operative in advance of the operation of the nail-driving devices, as and for the purposes set forth.

5. In a heel-attaching machine, in combination, a non-reciprocating rotatable carrier, a perforated templet mounted thereon and adapted to receive and hold a heel and transfer it from an inverted to an attaching position and a top-lift holder also mounted on said carrier and adapted to be moved therewith from an inverted or partially-inverted to an attaching position, means for locking said carrier in its heel-attaching and top-lift-attaching positions, and a last or work-support vertically movable toward and from the attaching position of said heel and said top-lift spanker, as set forth.

6. In a heel-attaching machine, in combination, a last or work-support vertically movable and a non-reciprocating heel-carrier mounted to turn upon an axis lying transversely to the vertical plane of the last from toe to heel, and carrying thereon means for conveying the heel from an inverted or partially-inverted position to an attaching position, and means operative with said last or work-support to attach said heel to the shoe, as and for the purposes set forth.

7. In a heel-attaching machine, in combination, a last or work-support vertically movable and a non-reciprocating top-lift holder mounted to turn upon an axis lying transversely to the vertical plane of the last from toe to heel, and carrying thereon means for conveying the heel from an inverted or partially-inverted position to an attaching position, and means operative with said last or work-support to attach said heel to the shoe, as and for the purposes set forth.

8. In a heel-attaching machine, a non-reciprocating rotatable carrier having mounted thereon a perforated templet and a top-lift holder and spanker, in combination with a last or work-support vertically movable relative to said templet and top-lift spanker, said carrier being mounted on an axis transversely to the length of the last from toe to heel, in combination with means for locking said carrier in an attaching position, as and for the purposes set forth.

9. In a heel-attaching machine, in combination, a non-reciprocating rotatable carrier, having a reciprocating driver-head, a perforated templet and a top-lift holder and spanker mounted thereon, means for locking said carrier in successive operative positions, and a last or work-support vertically movable relative to said templet and top-lift spanker when each is in an operative position, as and for the purposes set forth.

10. In a heel-attaching machine a non-reciprocating, rotatable carrier, a perforated templet, a nail-driving device mounted thereon and adapted to be turned therewith from an inverted or partially-inverted position to a driving position in combination with a last or work-support vertically movable in respect to said templet and a reciprocating head for actuating the nail-driving devices.

11. In a heel-attaching machine, a non-reciprocating rotatable head, a perforated templet and nail-drivers mounted thereon and adapted to be turned therewith from an inverted or partially-inverted position to a driving position and to transfer a heel and attaching-nails from an inverted or partially-inverted to a driving position, in combination with a reciprocating head carrying a work-support and adapted to move said work-support toward and from said rotatable head, as and for the purposes set forth.

12. The combination in a heel-attaching machine of a suitable stationary support, a rotatable head mounted thereon, having a templet and coöperating nail-drivers and a top-lift holder and spanker carried thereby with a reciprocating head for actuating the drivers having two reciprocations during the attachment of the heel-blank and top lift, one of which actuates the nail-drivers and the other of which is passive as the nail-drivers have been moved out of its path and a last or work-support vertically movable in respect to said templet and said top-lift spanker, said top-lift spanker being at a level farther removed from the last or work-support when in its highest position than the surface of the templet, as and for the purposes described.

13. The combination of the uprights $a^2$, the hollow bearings $a'$, the hollow carrier C to turn upon said bearings, a perforated templet, a top-lift holder and spanker carried thereby, a reciprocating cross-head extending through said hollow bearings and the cavity of the carrier, a driving-head carried thereby, and a vertically-movable last or work-support.

14. The combination of the carrier C mounted upon stationary bearings, a perforated templet and a top-lift holder and spanker arranged diametrically opposite each other upon said carrier, and an interposed reciprocating head.

15. The combination, in a heel-attaching machine, of a rotary carrier mounted upon a stationary support, perforated templets thereon arranged diametrically opposite each other, top-lift holders and spankers thereon arranged diametrically opposite each other, and an interposed reciprocating head.

16. In a heel-attaching machine, a non-reciprocating rotatable heel-carrier, a templet mounted thereon and having a multiple die, and being adapted to be turned therewith from an inverted or partially-inverted position to an attaching position and to transfer a heel and attaching-nails from an inverted or partially-inverted to a driving position, means whereby said carrier may be locked in either of said positions, in combination with a last or work-support vertically movable in respect to said stationary templet, a multiple gang of drivers and means for reciprocating the same, all as set forth.

17. The combination, in a heel-attaching machine, of a templet adapted to be turned upon a stationary support from an inverted or partially-inverted position to a driving position and provided with holes extending through it from one surface to the other, and a stationary nail-retaining plate M for retaining the nails in the holes of the templet while it is being turned.

18. In a heel-attaching machine in combination with a reciprocating work-support, a non-reciprocating rotatable carrier mounted upon a horizontal axis, said carrier having a presser-plate and a top-lift spanker mounted thereon and adapted to be turned therewith from an inverted or partially-inverted to an attaching position.

19. In a heel-attaching machine in combination with a reciprocating work-support, a non-reciprocating rotatable head mounted upon a horizontal axis, said head having a heel-carrier and a top-lift carrier mounted thereon, each adapted to be turned therewith from an inverted or partially-inverted position to an attaching position.

20. In a heel-attaching machine, a non-reciprocating rotatable head mounted upon a horizontal axis, said head having a nail-carrier mounted thereon and adapted to be turned therewith from an inverted or partially-inverted position to an attaching position, means for driving nails from said nail-carrier and means whereby said head is locked during the operation of said nail-driving mechanism, in combination with a reciprocating work-holder adapted to move the work to and from said rotatable head, as set forth.

FREEBORN F. RAYMOND, 2D.

Witnesses:
J. M. DOLAN,
L. A. WALSH.